United States Patent [19]

Orofino

[11] 3,986,950

[45] Oct. 19, 1976

[54] RECOVERY OF CHROMATES BY MEMBRANE

[75] Inventor: Thomas A. Orofino, Dayton, Ohio

[73] Assignee: Monsanto Company, St. Louis, Mo.

[22] Filed: Dec. 12, 1974

[21] Appl. No.: 532,087

[52] U.S. Cl. .......................... 210/22 R; 210/321 A
[51] Int. Cl.² ........................................ B01D 13/00
[58] Field of Search ...................... 210/23, 321, 22

[56] References Cited
UNITED STATES PATENTS

| | | | |
|---|---|---|---|
| 3,228,876 | 1/1966 | Mahon | 210/DIG. 23 |
| 3,468,796 | 9/1969 | Holl et al. | 210/321 X |
| 3,607,104 | 9/1971 | Blickle et al. | 210/321 X |
| 3,625,885 | 12/1971 | Geinopolos | 210/23 |

Primary Examiner—Frank A. Spear, Jr.
Attorney, Agent, or Firm—Russell E. Weinkauf

[57] ABSTRACT

A dialysis method for selectively removing chromates from cooling tower blow-down streams while retaining calcium and magnesium scaling compounds is provided. Preferential transport of chromates through the walls of hollow fiber assemblies is achieved by control of the chromic acid dissociation equilibrium, through feed and product pH adjustment. In a preferred mode, blowdown waste water is brought into contact with the exterior surface of the fibers while chromate-free make-up water is simultaneously circulated through the fiber bores. The permeating species is collected by the make-up water within the fiber bores for re-use in corrosion inhibition.

6 Claims, No Drawings

3,986,950

RECOVERY OF CHROMATES BY MEMBRANE

FIELD OF THE INVENTION

This invention relates to a method for separating and recovering hexavalent chromium containing salts from process water waste. More particularly, the invention pertains to a method for recovering the chromates which are present in cooling tower blow-down streams as corrosion inhibitors and transferring these valuable materials to the incoming make-up water.

BACKGROUND OF THE INVENTION

In many industrial operations it is necessary to remove large amounts of heat and circulating water is commonly used as a heat transfer medium. Various chemical treating agents are added to the water used for this purpose including chromium containing corrosion inhibitors in the form of chromate salts. In operation, the chemically treated process water is circulated through heat exchangers at the heat source and then passed to a cooling tower where it is cooled and recycled.

Since evaporation occurs in the cooling tower, there is a resulting increase in concentration of harmful scaling compounds and other dissolved solids present in the process water due to the losses in water volume. In order to maintain the solids concentration at acceptable levels, a portion of the process water is continuously withdrawn from the cooling tower and discharged as waste. This flow of waste water is generally referred to as the "blow-down" stream. It is, of course, necessary that fresh make-up water be added to the system to compensate for the volume lost by evaporation and blow-down. Also, chromate salts and other treating agents must be added to the make-up to compensate for the losses incurred in the blow-down flow.

The need to replace the relatively expensive corrosion inhibitors lost in the blow-down obviously adds to the cost of the cooling operation. In addition, the relatively high concentration of these materials in the blow-down stream causes difficult disposal problems. The reason for this is that hexavalent chromium is known to be toxic and its discharge into sewers and waterways has come under strict environmental control.

SUMMARY OF THE INVENTION

The invention is directed to a method for selectively removing chromates from the waste process water of cooling tower blow-down streams with the retention of calcium and magnesium scaling compounds in the blow-down flow. In addition, the method involves the transfer of the recovered chromates to the incoming process make-up water. Thus, the capability for both reduction in the chromate content of the waste stream and recovery of the valuable corrosion inhibitor for re-use in provided. Moreover, the cooling tower blow-down is rendered environmentally acceptable for discharge into sewers and waterways.

The basis for the method is a selective dialysis of chromates through the walls of hollow fiber membrane assemblies. Preferential transport of chromate is achieved through pH adjustment of the chromium containing waste water being treated. Briefly, the method includes adjusting the pH of the blow-down water to a level of less than 4.0 to shift the ionic equilibrium in favor of forming undissociated chromic acids. Following pH adjustment, the blow-down water is brought into contact with the exterior walls of a multiplicity of open-ended, continuous hollow fibers which are permeable to undissociated chromic acids while cooling tower make-up water is simultaneously passed through the interiors of the hollow fibers. Upon passage through the walls and into the hollow interior of the fibers, the permeating species is collected in the circulating cooling tower make-up water for further use in the cooling process in corrosion inhibition. In an alternative operating mode, the pH of the make-up water which is circulated through the fiber bores is likewise adjusted but on the alkaline side to a level of from about 7 to 12. In such case, the chromic acid permeant is neutralized and recovered in the form of a chromate salt. It is also contemplated that the method may be practiced by reversing the flow of the chromate containing blow-down stream and the cooling process make-up water. Thus, the blow-down water to be treated would be introduced into the bores of the hollow fiber membranes and the process make-up water brought into contact with exterior surfaces. In such case, permeation would proceed from the interior to the exterior of the fiber membranes.

DESCRIPTION

As has been noted, the basis for the method of this invention is a selective dialysis of chromates through the walls of hollow fiber membrane assemblies. That is, the chromate salts present in cooling tower waste water streams as corrosion inhibitors are separated from the high concentration of other solids dissolved therein, such as the scale-forming salts of calcium and magnesium, with the chromates being recovered for further use. Previously, it has not been possible to effectively separate highly ionized chromate salts from process water in which they are present by membrane dialysis methods. The reason for this is that chromate ions are highly rejected by most if not all known membrane systems, and a satisfactory transport rate through the membrane could not be obtained.

It has now been discovered that a change in the system which augments concentration of the undissociated form of an ionizable compound can be used as a means for accelerating selective transport of that species through a membrane. Thus, preferential transport of chromate is achieved in accordance with this invention by controlling the chromic acid dissociation equilibrium of the solution. That is, lowering the pH of the cooling tower waste stream which contains ionized chromate favors the formation of undissociated chromic acids which compounds exhibit a high transport rate through the membrane. Advantage is taken of this accelerated transport rate to effect separation of the chromates from calcium salts and other scale-forming solutes present in the waste process water. A pH range of from 0 to 4.0 has been found to provide satisfactory results, with a pH of from 0 to 3.0 being generally preferred. The type of acid used to adjust the pH is not critical, for example, hydrochloric or sulfuric acid may be used.

Hollow fiber membranes which preferentially permeate certain components of a fluid mixture while restraining other components have long been known as are the separatory devices in which they are employed. Such devices generally consist of a cylindrical shell or jacket for containing the open ended, continuous hollow fibers which extend through one or both ends of the jacket. The devices are usually adapted for flow of the feed fluid mixture or solution to be separated around the outsides of the hollow fibers with the component to be separated permeating through the walls of the fibers and being collected from the inside in the fiber bore. Typical of such devices and the hollow fiber assemblies used therein are illustrated and described in U.S. Pat. Nos. 3,228,876 and 3,228,877. The hollow fiber configuration offers considerable advantage over flat or tubular membranes because it provides a very large surface area for mass transfer. Theoretically, the entire circumferential outer surface of each fiber is available for exposure to the feed fluid to be separated. For application in the method of the present invention, the hollow fiber membranes may be formed from cellulose acetate, aromatic polyamides or any other material which is selectively permeable to chromic acids. Best results are obtained by a membrane structure which is relatively dense as contrasted with the loose-type membrane. The reason is that with tighter membranes selectivity is significantly enhanced. The membrane of choice in terms of density may be defined as one capable of rejecting at least 95 percent total solids from a solution containing 5,000 parts per million of sodium chloride.

A preferred mode of practicing the method herein described would be to pump the blow-down stream, containing chromium and various other salts, along the shell-side of a hollow fiber unit; adjusted and maintained at a pH of from 0 to 3.0 and at a pressure sufficient for nullifying, or reversing, the normal osmotic flow of water across the fiber wall due to the high concentration of dissolved salts present in this stream. Simultaneously, make-up water, containing no chromium and a relatively low concentration of other naturally occurring salts, would be pumped counter-currently, bore-side, at a pressure just sufficient for bore-side circulation of the stream. The trans-membrane pressure across the fiber wall would be zero or positive at all points along the fiber length, as measured on the shell-side. This would ensure limited, nil, or reversed osmotic flow of water to the shell side at all points with no net internal pressure on the fiber system.

As an option, the pH of the make-up water which is circulated through the bore-side of the hollow fibers may be adjusted to the range of from about 7 to 12. This would tend to increase the concentration gradient of the permeating species between the shell and bore sides of the hollow fiber membrane. That is, the permeating chromic acid species would be neutralized to non-permeating chromate salts upon contact with the alkaline make-up water in the fiber bore. This would have a beneficial effect upon the transport rate across the membrane wall of the undissociated chromic acid permeant.

Although it is preferred that the blow-down and make-up water be introduced into the system in counter-current flow, co-current flow could also be used. Likewise, as an alternative to introducing the cooling tower water on the shell-side space between fibers (i.e. along the outside surface of the fibers) and the make-up water into the fiber bores, the flow regime could be reversed in which case permeation would proceed from the interior to the exterior fiber surface.

The data shown in Table 1 below was obtained in a typical test run employing an annealed, standard cellulose acetate hollow fiber system placed in a double-ended module designed for control of both bore and shell-side flow. A test feed was prepared to simulate cooling tower blow-down streams and consisted of an aqueous solution of sodium dichromate and calcium chloride. In operation, the test solution adjusted to a pH of 3.0 was pumped to the outside (shellside) of the hollow fibers while distilled water was pumped into the fiber bores in a flow counter-current to that of the test feed. The test conditions and results obtained are summarized in the Table following:

TABLE I

| | |
|---|---|
| Shell Feed (ppm) Cr/Ca | 49/529 |
| Shell Feed (pH) | 3.0 |
| Shell Feed Rate cc/min. | 8.5 |
| Shell Exit Rate cc/min. | 8.5 |
| Bore Feed Rate cc/min. | 6.0 |
| Bore Exit Rate cc/min. | 6.0 |
| Shell Exit (ppm) Cr/Ca | 31/425 |
| Bore Exit (ppm) Cr/Ca | 15/23 |

It is clear from the above results that the fiber membrane system was definitely more permeable to the chromate, since the chromate/calcium ratios went from 0.09 in the simulated blow-down to 0.67 in the make-up water exiting from the fiber bore.

In order to demonstrate the significance of pH control in the method of this invention, a series of experimental runs were made utilizing a hollow fiber dialysis system such as described hereinabove. In operation, a chromate and calcium containing feed, adjusted to various pH levels, was pumped in a once-through mode on the outside (i.e. shell-side) of the fibers at 50 psig sustained pressure (to prevent osmotic flow of water). Simultaneously, distilled water was pumped bore-side, in a once-through, counter-current mode, at various flow rates, leaving the system at atmospheric pressure. Flows and pressures were monitored at steady-state conditions and then samples of bore and shell discharge were collected. The feed solutions used in the test runs contained 540 ppm of chromate and 1394 ppm of calcium. The strong dependence of selectivity and chromate transport rate on pH is shown by the experimental results set-forth in the following Table.

TABLE 2

| Test Run | Shell Feed pH | *Selectivity Ratio Cr/Ca |
|---|---|---|
| 1 | 3.0 | 7.7 |
| 2 | 4.0 | 2.6 |
| 3 | 5.0 | 1.7 |
| 4 | 6.0 | 1.5 |
| 5 | 7.0 | .052 |

*Selectivity Ratio = $\dfrac{(Cr/Ca)\ Bore\ Product}{(Cr/Ca)\ Shell\ Feed}$

It is apparent from the above data that selectivity and chromate transport rate could be even further enhanced at pH levels below 3.0.

What is claimed is:

1. A method for removing chromate ions from the waste water of cooling tower blow-down streams and recovering the chromate in the form of chromic acids in cooling tower make-up water, said method comprising:

a. adjusting the pH of the waste water to a level of less than 4.0 to convert the chromate ions contained therein to undissociated chromic acids;
b. passing the waste water into contact with the exterior walls of a multiplicity of open ended, continuous hollow fibers formed of a material which is selectively permeable to said undissociated chromic acids while simultaneously passing chromate free, cooling tower make-up water through the interiors of said hollow fibers;
c. allowing the undissociated chromic acids to permeate by dialysis through the walls of said hollow fibers and into the interiors thereof; and
d. recovering the chromic acid in the cooling tower makeup water present in the interiors of said hollow fibers.

2. The method in accordance with claim 1, wherein the pH of the waste water is adjusted to a level of from 0 to 3.0.

3. The method in accordance with claim 1, wherein the continuous hollow fibers are formed from cellulose acetate.

4. A method for removing chromate ions from the waste water of cooling tower blow-down streams and recovering the chromate in the form of a salt in cooling tower make-up water, said method comprising:

a. adjusting the pH of the waste water to a level of less than 4.0 to convert the chromate ions contained therein to undissociated chromic acids:
b. passing the waste water into contact with the exterior walls of a multiplicity of open ended, continuous hollow fibers formed of a material which is selectively permeable to said undissociated chromic acids while simultaneously passing chromate free, cooling tower make-up water maintained at a pH of from 7–12 through the interiors of said hollow fibers;
c. allowing the undissociated chromic acids to permeate through the walls of said hollow fibers and into the interiors thereof where the permeated chromic acids became neutralized to chromate salts in the presence of the cooling tower make-up water maintained at a pH of from 7–12; and
d. recovering the chromate salts in the cooling tower make-up water.

5. The method in accordance with claim 4, wherein the pH of the waste water is adjusted to a level of from 0 to 3.0.

6. The method in accordance with claim 4, wherein the continuous hollow fibers are formed from cellulose acetate.

* * * * *